US006369878B1

(12) United States Patent
Zevin et al.

(10) Patent No.: US 6,369,878 B1
(45) Date of Patent: Apr. 9, 2002

(54) DUAL-ROLLER OVERDRIVEN PEEL MECHANISM

(75) Inventors: Thomas M. Zevin, Canoga Park; Douglas L. Harb, Woodland Hills; Alexander Peter, Van Nuys; Philip Bryer, Tarzana, all of CA (US)

(73) Assignee: Eltron International, Inc. (ZEBRA), Camarillo, CA (US)

( * ) Notice: Subject to any disclaimer, the term of this patent is extended or adjusted under 35 U.S.C. 154(b) by 0 days.

(21) Appl. No.: 09/640,493

(22) Filed: Aug. 16, 2000

(51) Int. Cl.[7] ........................ G03B 27/04; G03B 27/58; B41J 2/01; B41J 2/38

(52) U.S. Cl. ........................... 355/97; 355/72; 355/128; 355/130; 347/101; 347/187; 347/215

(58) Field of Search ............................ 355/72, 97, 128, 355/130; 347/215, 101, 187

(56) References Cited

U.S. PATENT DOCUMENTS 5,957,597 A * 9/1999 Kato .......................... 400/621
6,004,052 A * 12/1999 Muranaka ................... 347/105
6,151,055 A * 11/2000 Ackley et al. .............. 347/215

* cited by examiner

*Primary Examiner*—Russell Adams
*Assistant Examiner*—Khaled Brown
(74) *Attorney, Agent, or Firm*—Fulbright & Jaworski L.L.P.

(57) ABSTRACT

An imaging forming device using a platen, an upper peel roller, a lower peel roller movably positioned under and parallel to the upper peel roller, a diverter bar rotatably positioned underneath the platen and near the upper and lower peel rollers and adapted to guide a printable medium backing to move between the platen and the upper peel roller to between the upper and lower peel rollers, a peel bar rotatably positioned over the upper peel roller, a pair of lever cams rotatably positioned respectively at opposite ends of the upper and lower peel rollers, the lever cams are adapted to push the lower peel roller to press the printable medium backing against the upper peel roller during operation for moving the printable medium backing through the imaging forming device and to allow the lower peel roller to separate apart from the upper peel roller when the imaging forming device is open for loading the printable medium backing in between the upper and lower rollers.

12 Claims, 7 Drawing Sheets

DUAL-ROLLER OVERDRIVEN PEEL MECHANISM

FIELD OF THE INVENTION

The present invention relates generally to an image forming device and more particularly to a printer having a dual-roller overdriven peel mechanism for peeling a protective backing of a label roll from labels attached to the protective backing.

BACKGROUND OF THE INVENTION

A conventional printer typically has a print head adapted to form images on a printable medium and a platen to press the printable medium tightly against the print head so that the print head may properly form images on the printable medium. Often, the conventional printer also includes a roller to press the printable medium backing against the platen for moving the printable medium through the conventional printer in order to provide a peeling mechanism. Printable media are available commercially in many different forms such as separate sheets of papers, a label roll having labels attached to a protective backing, or simply a paper roll.

The conventional printer requires a pressing mechanism to force or press the platen against the print head and to force or press the conventional peel roller against the platen. The pressing mechanism must be carefully designed to adequately provide a first pressure between the platen and the print head and a second pressure between the platen and the roller. If the first pressure is too low, the print head could not form quality images on the printable medium, while if the second pressure is too low, the roller could not adequately move the printable medium backing through the printer. On the other hand, if either pressure is too high, the printable medium might be trapped therein between and jam the printer. Typically, the first pressure between the platen and the print head is approximately 2 lb/inch, and the second pressure between the platen and the roller is approximately 1 lb/inch.

The peel roller of the conventional printer typically has a surface coated with polytetrafluoroethylene (PTFE) TEFLON™, hereinafter referred to as PTFE. Normally, the PTFE-coated surface of the roller has a glossy smooth surface. Thus, when the roller rotates while pressing against the platen, it will not wear or scratch the surface of the platen and will not make the platen's surface rough over time. The capability to keep the surface of the platen smooth is highly desirable. Otherwise, a platen having a rough surface will degrade the condition of having even pressure against the print head, and thus will prevent the printer from producing good quality printouts.

The smooth surface of the roller prevents coarsening the surface of the platen, but it also causes some drawbacks to the conventional printer. For instance, due to the smooth surface of the roller, the roller has to exert greater pressure on the platen in order to move the printable medium without causing slips of the printable medium. The smooth surface of the roller also makes it more difficult to maintain accurate traction of the printable medium backing passing through the roller. This would increase possibilities of misalignment of the printable medium within the conventional printer. Moreover, it is easier for the protective backing of the label roll to stick on a smooth surface, as compared to a less smooth surface, of the roller. If the protective backing sticks on the roller, it might jam the printer. The smooth surface is also prone to incur residual adhesives of the protective backing to build up on the rollers surface. As a result, the residual adhesives will likely be transferred to the platen and cause problems in contact with the print head. An improved peel mechanism is therefore needed to overcome the above-mentioned problems commonly suffered by the conventional printer.

SUMMARY OF THE INVENTION

An object of the present invention is to provide a printer having a peel roller mechanism that will overcome the above-mentioned problems associated with the roller of the conventional printer. This object is met by providing a dual roller overdriven peel mechanism according to the present invention, as indicated in the claims appended hereto.

The dual roller overdriven peel mechanism of the printer comprises first and second peel rollers rotatably adapted to contact each other to cause the printable medium backing to move through the printer. In a preferred embodiment of the present invention, the first peel roller functions as a driven roller and is coated with tungsten-carbide PTFE materials on its outer surface. The PTFE material allows slip to occur to accommodate a 4% overdrive while maintaining the necessary equilibrium. The first peel roller is coupled to a pair of roller gears respectively positioned at opposite ends of the first peel roller. The surface of the second peel roller is preferably coated with urethane. The printer further comprises a platen for pressing the printable medium against a print head. The platen does not contact the first peel roller, but it is coupled to a pair of platen gears respectively positioned near opposite ends of the platen. One end of the platen is coupled to a motor of the printer through a motor gear mechanism for rotating the platen. The pair of the roller gears and the pair of the platen gears are properly positioned for respectively meshing with each other such that the platen gears will drive both the platen and the first peel roller even though the platen does not contact the first peel roller physically through respective outside diameters.

BRIEF DESCRIPTION OF THE DRAWINGS

The foregoing and additional features and advantages of this present invention will become apparent by way of non-limitative examples shown in the accompanying drawings and detailed descriptions that follow. In the figures and written descriptions, numerals indicate the various features of the invention, like numerals referring to like features throughout both the drawing figures and the written description.

FIG. 1(*b*) is another front view of the printer showing a printable medium circled around the dual roller peel mechanism of FIG. 1(*a*).

FIG. 1(*c*) is a third front perspective view of the printer of the present invention.

DETAILED DESCRIPTION OF THE INVENTION

Figure 1A:
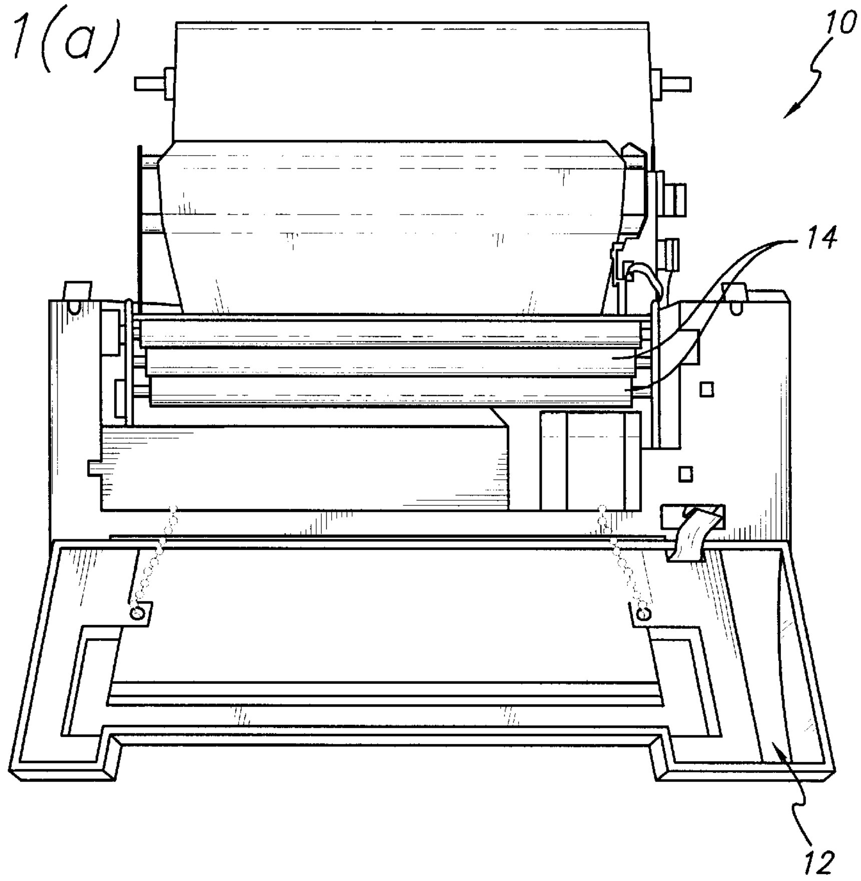
FIG. 1(*a*) is a front view of a printer having a dual roller peel mechanism according to the present invention.
Figure 1B:
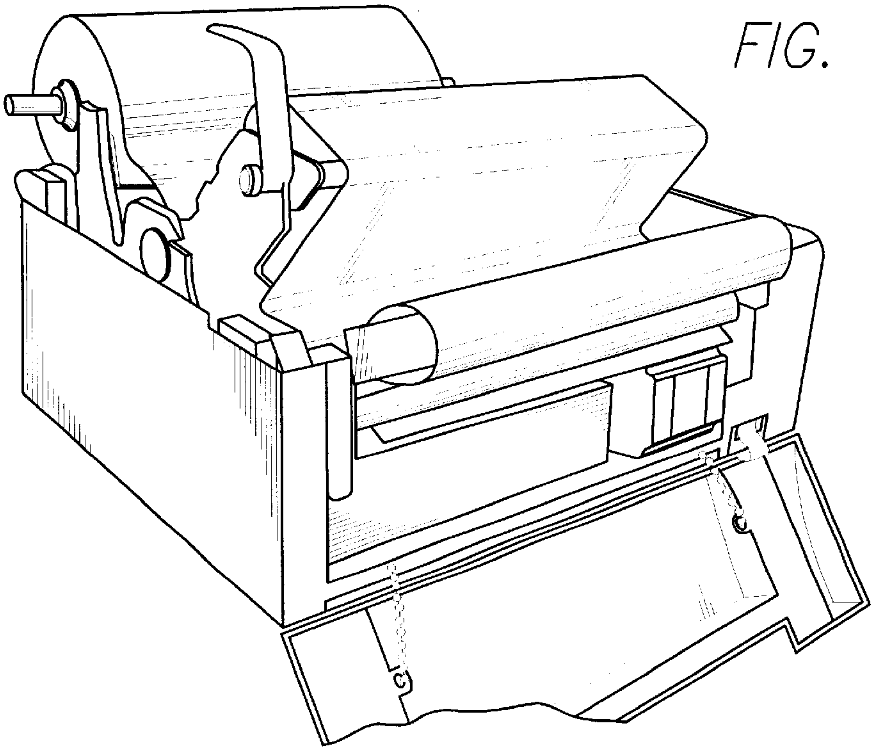
Figure 1C:
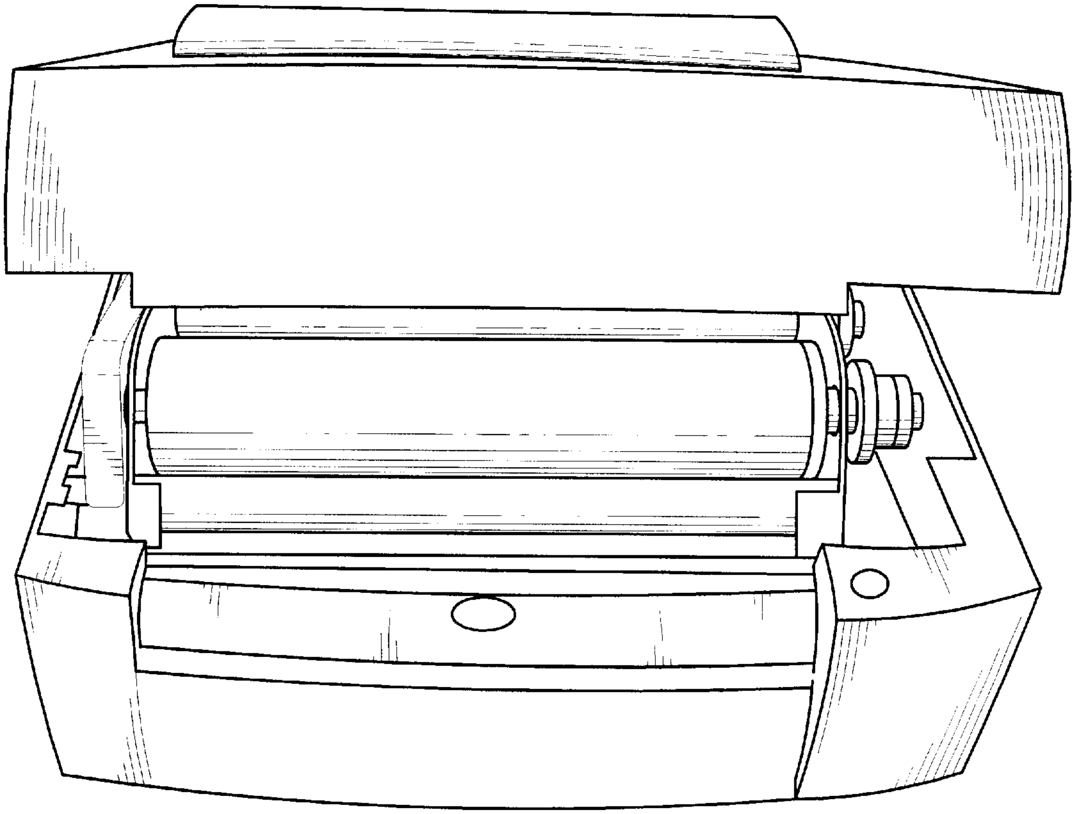

FIG. 1(*a*) is a front view of printer 10 illustrating a preferred embodiment of the present invention having dual roller peel mechanism 14 incorporated into the printer 10 near the front end thereof. In FIG. 1(*a*), front door panel 12 is opened to show the internal configuration of the printer 10.

Figure 2:
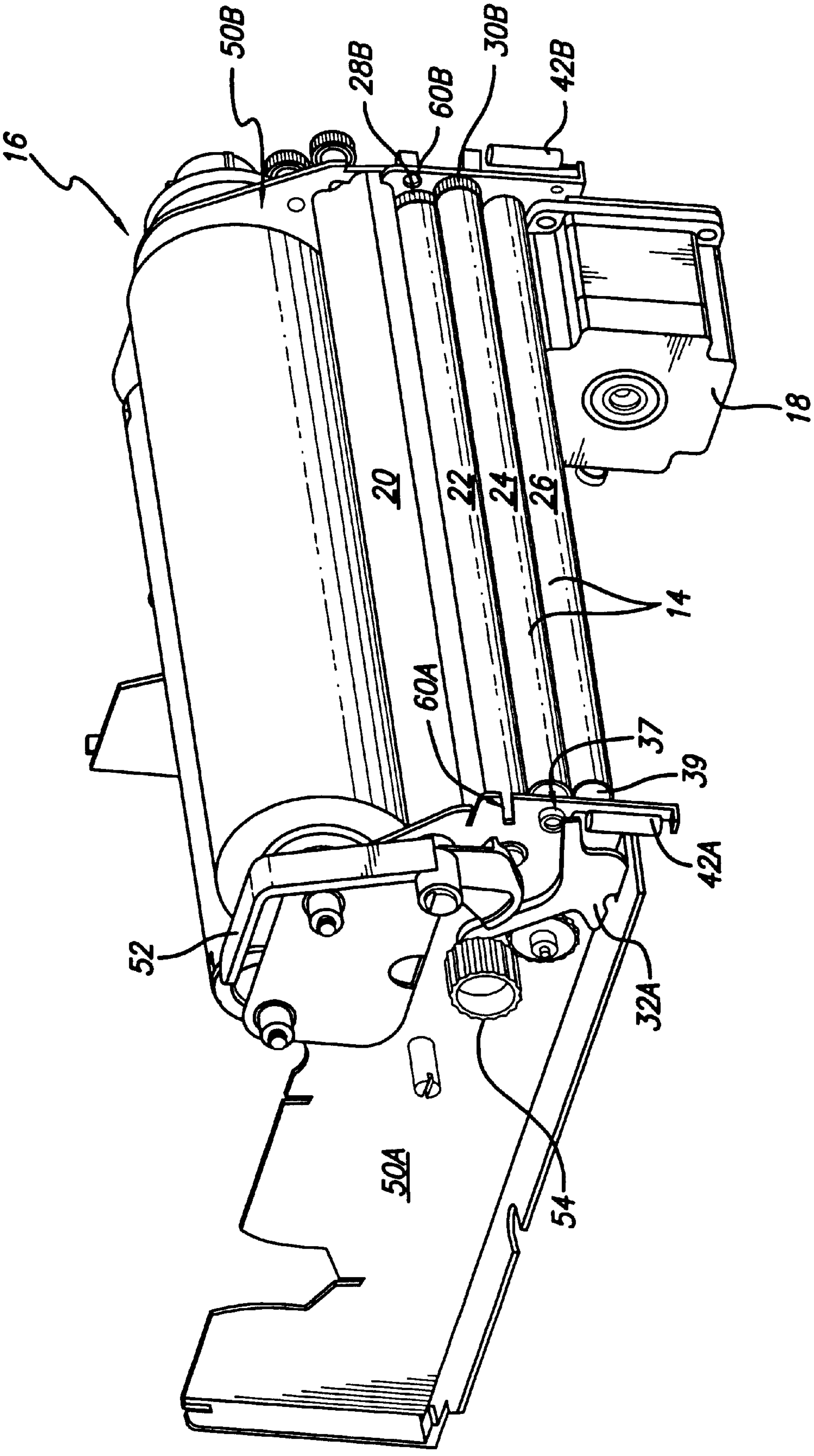
FIG. 2 is a perspective view of the dual roller peel mechanism mounted on side frame brackets with a medium mechanism coupled to the dual roller peel mechanism in a close position.

FIG. 2 shows a medium mechanism 16 adapted to be pivotally opened and closed over the top of the dual roller peel mechanism 14. FIG. 2 shows a platen 22 rotatably coupled to the left and right side brackets 50A, 50B at opposite ends. The platen 22 is positioned slightly behind and above the dual roller peel mechanism 14. Platen gears 28A, 28B are respectively coupled to the platen 22 at the inner side of the left and right side brackets 50A, 50B. The right end of the platen shaft 34 (shown in FIG. 3) is securely coupled to the gear system 54 at the outer side of the right side bracket 50B. Motor 18 is securely coupled to the right side bracket 50B at an inner side under the dual roller peel mechanism 14. The motor 18 is preferably a step motor adapted to drive the dual roller peel mechanism 14 through a gear system 54. Therefore, the motor 18 can control the rotation of the platen 22 through rotating the gear system 54. Unlike the conventional printer, the surface of the platen 22 does not contact the surface of upper roller 24 of the dual roller peel mechanism 14. As a result, the platen 22 of the present invention will experience less wear during operation and, thus, will have a longer useful life as compared to a platen of the conventional printer.

Figure 3:
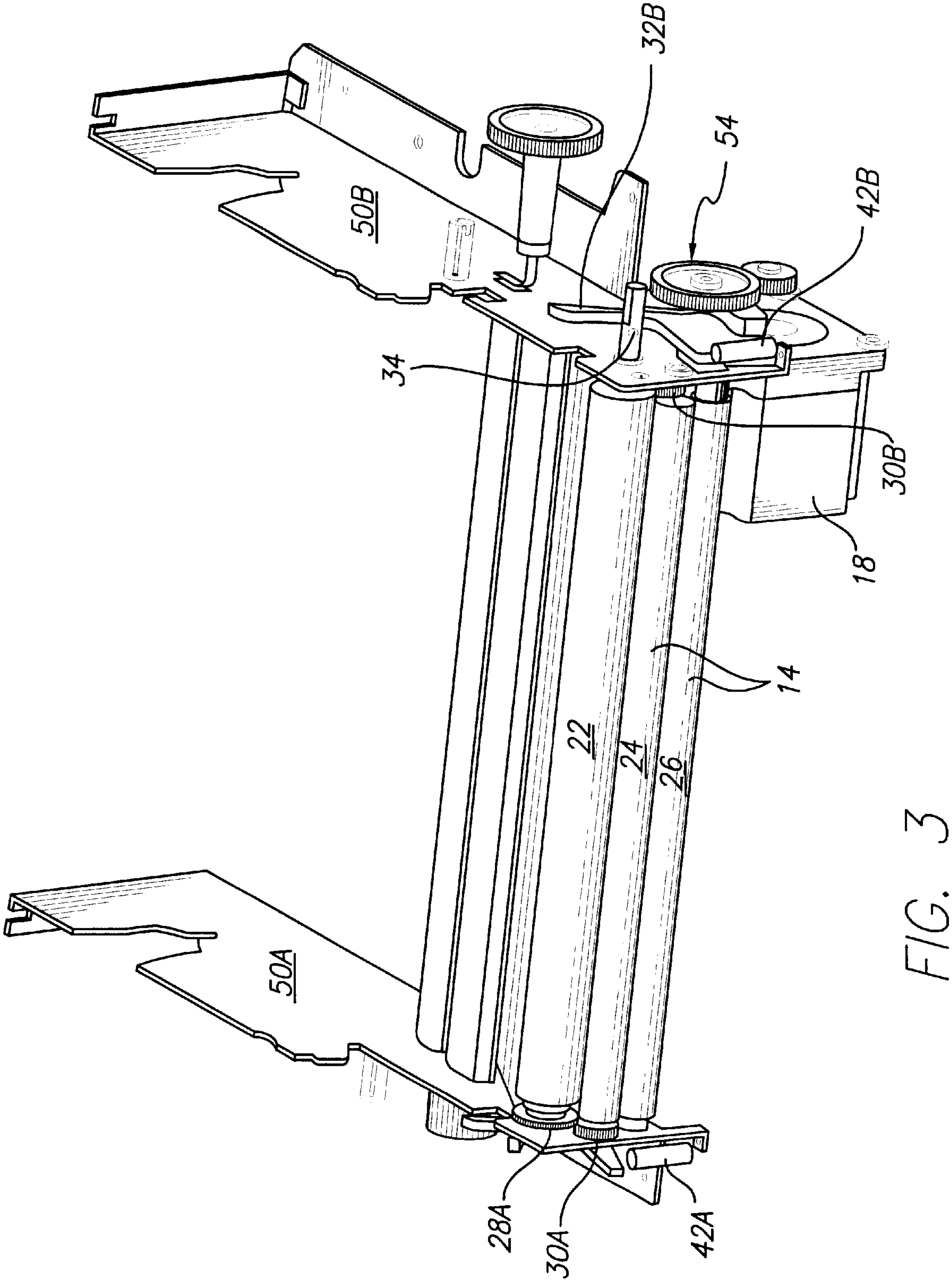
FIG. 3 is a perspective view of the dual roller peel mechanism without the medium mechanism.

As shown in FIG. 3, the dual roller peel mechanism 14 is securely mounted to left and right side brackets 50A, 50B of the printer 10 at opposite ends and is positioned inside the printer 10 near the front end. See also FIGS. 1(*a*) and (*b*).

Figure 4:
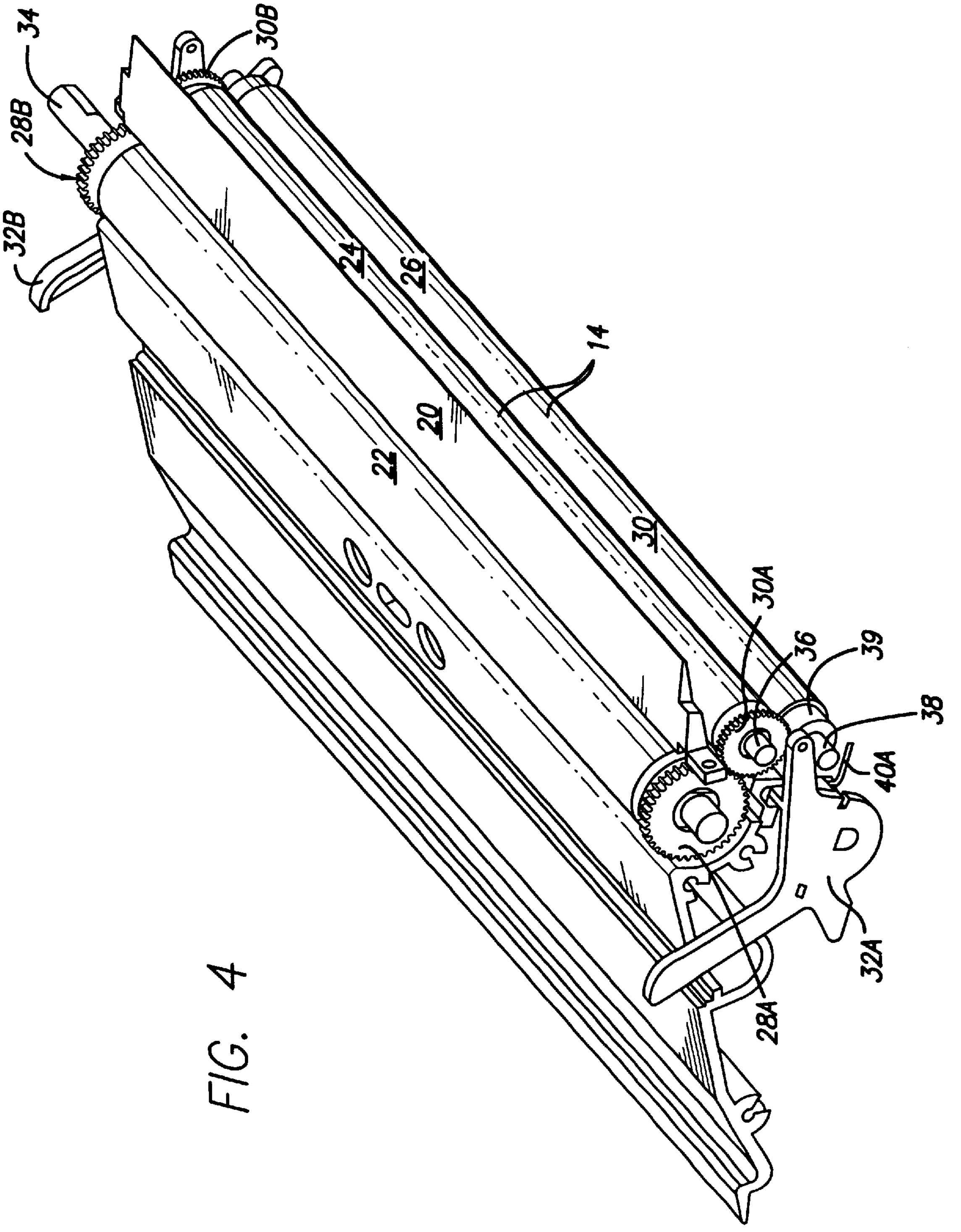
FIG. 4 is a perspective view of the dual roller peel mechanism without the side frame brackets.

As shown in FIG. 4, the dual roller peel mechanism 14 includes the upper roller 24 having an upper roller shaft 36 rotatably coupled to the left and right side brackets 50A, 50B at opposite ends and a second roller, i.e., the lower roller 26, positioned directly under the upper roller 24. Similarly, the lower roller 26 has a lower roller shaft 38 rotatably coupled to the left and right side brackets 50A, 50B by inserting opposite ends of the lower roller shaft 38 into respective reception holes (not shown) on the left and right side brackets 50A, 50B. The reception holes for ends of the lower roller shaft 38 have a vertical rectangular shape and have vertical lengths slightly longer than the vertical diameter of the lower roller shaft 38, to thereby allow the lower roller 26 to move vertically. In the preferred embodiment, the vertical lengths of the lower reception holes are respectively approximately 0.41 inches long while the vertical diameter of the bearing for the lower roller shaft 38 within the lower reception holes is approximately 0.31 inches. The lower roller 26 is a solid metal roller with an elastomeric coating, such as urethane material 30 (FIG. 4), which covers the surface of the solid metal roller. The lower roller 26 rotates on its lower roller shaft 38. As shown in FIG. 4, a pair of lever cams 32A and 32B are used to compress the lower roller 26 against the upper roller 24. The lower roller 26 rides in its bearings in the vertical reception holes so that the lower roller can be compressed against the upper roller. The overall diameter of the lower roller 26 is approximately 0.47 inches.

As shown in FIG. 2, a pair of collars 37 are securely mounted on the side brackets 50A, 50B respectively and directly above the lower reception holes. The upper roller 24 has upper roller shaft 36 rotatably inserted into the collars 37 respectively at opposite ends. Thus, the upper roller 24 is positioned directly above and parallel to lower roller 26. In the preferred embodiment of the present invention, the upper roller 24 has a layer of tungsten carbide material with a thin PTFE overcoat on the surface wrapping around upper roller shaft 36. The overall diameter of the upper roller 24, including the tungsten carbide materials, is of approximately 0.49 inches, which is about the same size as of the lower roller 26.

Moreover, a pair of roller gears 30A, 30B (FIGS. 2 and 3) are coupled to opposite ends of the upper roller shaft 36 at the inner sides of the left and right side brackets 50A, 50B. The roller gears 30A, 30B mesh with the platen gears 28A, 28B respectively, as shown in FIG. 4, allowing the platen 22 to rotate the upper roller 24 during operation. The overall diameter of the platen 22 is of approximately 0.78 inches. The diameters of the platen gears 28A, 28B are respectively approximately 0.85 inches and the diameters of the roller gears 30A, 30B are respectively approximately 0.51 inches. As a result of the diameter ratios between the respective gear pairs (28A, 30A) and (28B, 30B), the upper roller 24 of the peel mechanism 14 will have a faster surface speed than the platen 22 and will tend to move the printable medium backing approximately 4% faster than the platen 22 does. As a result, a tension will build up on the printable medium backing to prevent slack of the printable medium backing when it moves through the printer 10.

Figure 6:
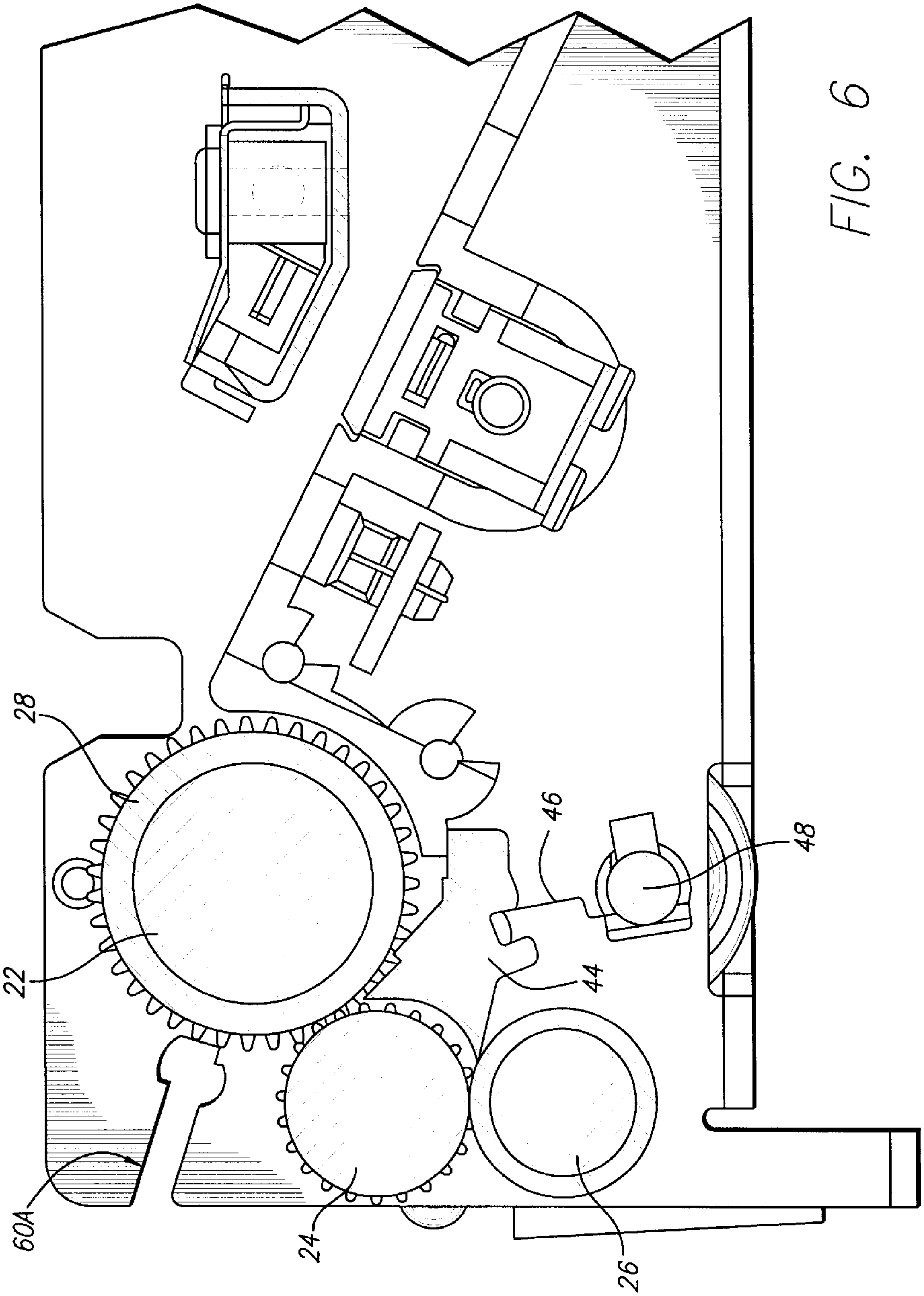
FIG. 6 is another cross-sectional view of the dual roller peel mechanism.

As shown in FIG. 2, a pair of lever cams 32A, 32B is rotatably coupled to the left and right side brackets 50A, 50B at the respective outer sides thereof and to each other by a pivotal axle 48 (see FIG. 6). Thus, when one lever cam 32A or 32B rotates, the other cam 32B or 32A will rotate correspondingly. Moreover, as shown in FIG. 4, a first pair of coil springs 40A, 40B encircles the pivotal axle 48 between the lever cams 32A, 32B and the respective left and right side brackets 50A, 50B. The coil springs 40A, 40B extend their respective front end sections under the lower roller shaft 38. Therefore, when a lock lever 52, shown in FIG. 2, rotates the lever cams 32A, 32B counterclockwise (looking inward from the left side) to lock the medium mechanism 16, shown in FIG. 2, with the peel mechanism 14 for the operation position, the coil springs 40A, 40B will push the lower roller 26 upward to press or force or urge against the upper roller 24. The combined pressure of coil springs 40A and 40B act to exert a uniform pressure of approximately 1 lb/in. between rollers 26 and 24.

As shown in FIGS. 2 and 3, a pair of second coil springs 42A, 42B are respectively coupled between the front end of the lever cams 32A, 32B and the front end bottoms of the left and right side brackets 50A, 50B. The second pair of coil springs 42A, 42B pulls the front end of the lever cams 32A, 32B downward. Therefore, when the medium mechanism 16 is pivotally opened from the peel mechanism 14, the lever cams 32A, 32B are at their respective rest positions where the coil springs 40A, 40B are at their lowest positions and the lower roller 26 is separated apart from the upper roller 24.

As shown in FIG. 2, a peel bar 20 is rotatably coupled to the left and right side brackets 50A, 50B by inserting a pair of pin extrusions of the peel bar respectively at both ends into a bar receiving slot 60A of the left side bracket 50A and a bar receiving hole 60B of the right side bracket 50B respectively. The peel bar 20 is positioned above the upper roller 24, thereby the printable medium will move over the peel bar 20 once it passes the platen 22 after printing. The peel bar 20 is secured at an approximately 18° upward angle from the horizontal during operation. In the case of a label roll, the protective backing of the label roll is wound about to go under the peel bar 20 to be inserted between the upper roller 24 and the platen 22 and then between the upper and lower rollers 24, 26. During operation, the upper and lower rollers 24, 26 together pull the protective backing of the label roll to come out of the printer 10 at the front end. Normally, the labels of the label roll are not too adhesive to the protective backing. Thus, when the protective backing winds around the peel bar 20, the labels of the label roll will automatically separate from the protective backing once they pass over the peel bar 20.

Figure 5:
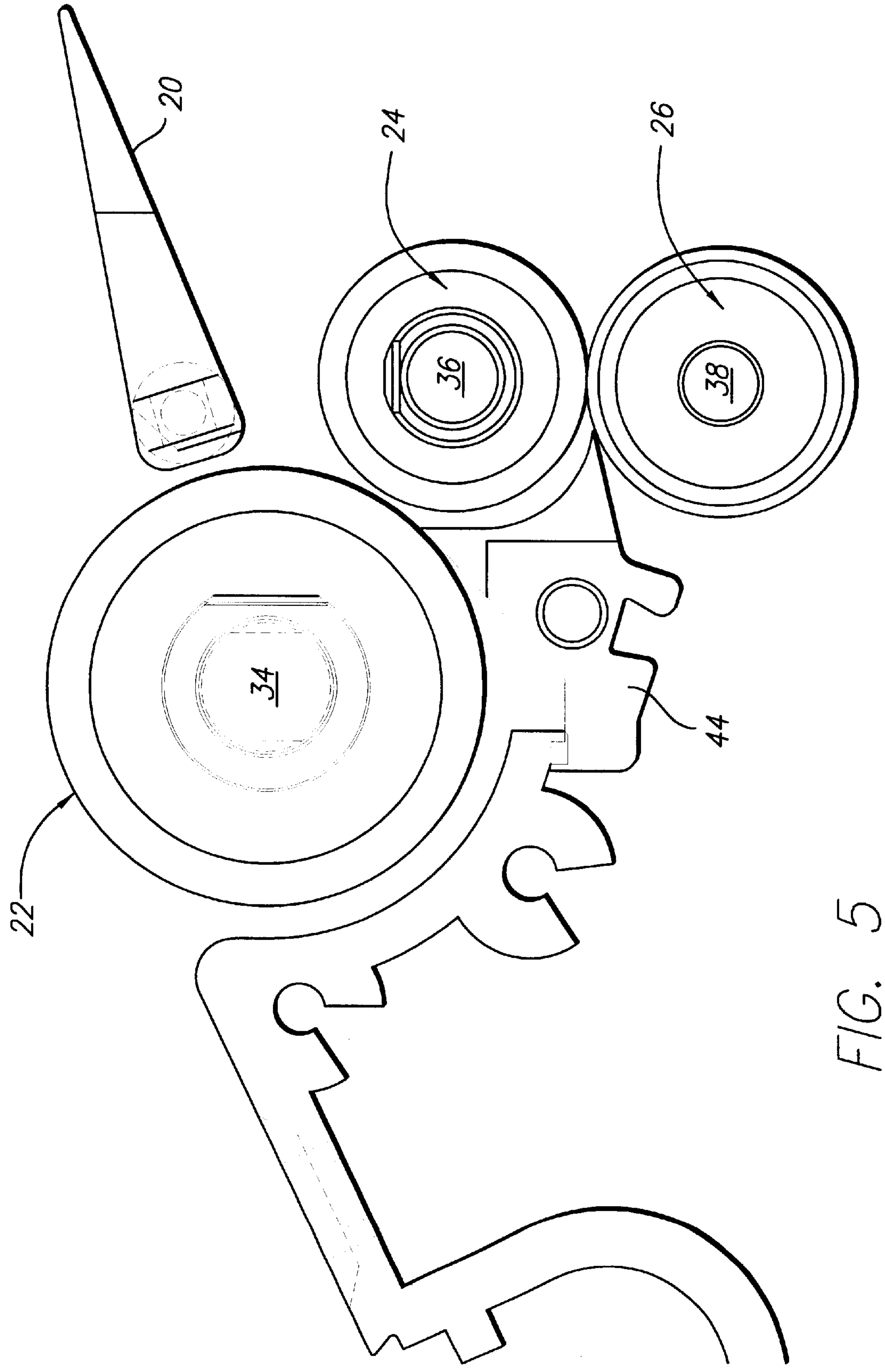
FIG. 5 is a cross-sectional view of the dual roller peel mechanism in an operational position.

As shown in FIG. 5, an optional diverter bar 44 is rotatably coupled to the left and right side brackets 50A, 50B at opposite ends and is positioned under the platen 22 and next to the upper and lower rollers 24, 26. See also FIG. 6, As shown in FIG. 6, the diverter bar 44 has a curved surface facing the upper roller 24 to guide the printable medium (the protective backing in the case of a label roll) moving between the platen 22 and the upper roller 24 toward between the upper and lower rollers 24, 26. A pair of leaf springs 46 are securely coupled to the pivotal axle 48 respectively near the inner sides of the side brackets 50A, 50B. Each of the leaf springs 46 has one end extending into a recession under the diverter bar 44. When the leaf springs 46 press against the back wall of the recession of the diverter bar 44, the diverter bar 44 will rotate slightly clockwise (seeing inward from the left side of the printer 10) and the upper tip of the curved surface of the diverter bar 44 will move slightly closer to the upper roller 24. Conversely, when the leaf spring 46 presses against the front wall of the recession of the diverter bar 44, the diverter bar 44 will rotate slightly counterclockwise and the upper tip of the curved surface of the diverter bar 44 will move slightly closer to connect the platen 22. When the medium mechanism 16 is opened from the peel mechanism 14, the lever cams 32A, 32B cause the leaf springs 46 to press against the front wall of the recession of the diverter bar 44. See also FIG. 2. The tip of the curved surface of the diverter bar 44 will then move toward the platen 22 as mentioned to prevent the protective backing from moving underneath the platen 22, i.e., the protective backing will be directed toward and between the upper and lower rollers 24, 26, during insertion. When the medium mechanism 16 is closed for operation, the lock lever 52 rotates the lever cams 32A, 32B to cause the leaf springs 46 to press against the back wall of the recession of the diverter bar 44. See also FIG. 2. Thus, the diverter bar 44 will move slightly toward the peel mechanism 14 to prevent any contacts of the diverter bar 44 and the platen 22 during operation.

The PTFE overcoat on the tungsten carbide surface has a sandy grainy texture and, therefore, provides unique advantages for the present invention over rollers in conventional printers. Firstly, the sandy grainy texture of the upper roller's surface creates a collection of many very small contact areas between the upper roller 24 and the printable medium backing passing by the upper roller 24. This feature provides a much better traction of the printable medium during operation, as compared to the typically glossy-surface roller of the conventional printer. Secondly, the sandy grainy texture prevents the upper roller 24 from sticking to the protective backing. Normally, an upper surface of the protective backing facing the upper roller 24 has adhesive residues on its surface and is prone to stick to printer components it passes by. The tungsten carbide surface of the upper roller 24 prevents the protective backing from sticking to the upper roller 24 and, thus, from jamming the printer 10 during operation. Thirdly, the tungsten carbide surface of the upper roller 24 also prevents adhesive residues of protective backing from building up on the surface of the upper roller 24. Thus, no adhesive residues will accumulate on the surface of the upper roller 24 to cause problems during operation.

From the foregoing, it will be appreciated that, although specific embodiments of the invention have been described herein for purposes of illustration, various modifications may be made by persons skilled in the art without deviating from the spirit and/or scope of the invention. Particularly, the pressure between the upper and lower rollers can be adjusted according to the needs of different applications or printers.

What is claimed is:

1. A mechanism for peeling protective backing from imaged print media in an image forming device having a rotatable platen, said mechanism comprising:

a peel bar pivoted at a first end proximate to said rotatable platen and adapted to peel off imaged print media from a moving protective backing at a second end;

an upper roller disposed proximate to said rotatable platen under said peel bar and adapted to be rotatably driven by said rotatable platen; and a lower roller disposed under said upper roller and adapted to be pressed against said upper roller when said platen is rotating, said upper and lower rollers adapted to rotatably drive said protective backing downstream from said second end of said peel bar past said rotating platen at a faster speed than the speed of said rotating platen, said upper roller having an outer surface not being in contact with said platen and adapted to allow slip to occur between said protective backing and said outer surface of said upper roller in order to tension said moving protective backing at said second end of said peel bar.

2. The mechanism of claim 1, further comprising:

a motor;

a first gear mechanism operatively coupled between said motor and said platen to allow said motor to rotate said platen; and a second gear mechanism operatively coupled to said first gear mechanism to allow said rotating platen to rotate said upper roller.

3. The mechanism of claim 1, further comprising a lever cam mechanism adapted to press said lower roller against said upper roller when said platen is rotating and to separate said lower roller from said upper roller for loading protective backing when said platen is not rotating.

4. The mechanism of claim 3, wherein said lever cam mechanism comprises:

first and second lever cams rotatably disposed at respective opposite ends of said upper and lower rollers;

first and second elastic mechanisms respectively coupled to said first and second lever cams for urging said lower roller to press against said upper roller for peeling off imaged print media from said protective backing; and third and fourth elastic mechanisms respectively coupled to said first and second lever cams for urging said first and second lever cams to come to a rest position to allow said lower roller to separate from said upper roller for loading protective backing.

5. The mechanism of claim 4, wherein each of said first, second, third, and fourth elastic mechanisms respectively comprises a coil spring.

6. A mechanism for peeling protective backing from imaged print media in an image forming device having a rotatable platen, said mechanism comprising:

(a) a peel bar pivoted at a first end proximate to said rotatable platen and adapted to peel off imaged print media from a moving protective backing at a second end;

(b) an upper roller disposed proximate to said rotatable platen under said peel bar and adapted to be rotatably driven by said rotatable platen;

(c) a lower roller disposed under said upper roller and adapted to be pressed against said upper roller when said platen is rotating, said upper and lower rollers adapted to rotatably drive said protective backing downstream from said second end of said peel bar past said rotating platen at a faster speed than the speed of said rotating platen, said upper roller having an outer surface not being in contact with said platen and adapted to allow slip to occur between said protective backing and said outer surface of said upper roller in order to tension said moving protective backing at said second end of said peel bar and prevent said protective backing from sticking to said upper roller after said imaged print media is peeled off from said protective backing at said second end of said peel bar; and (d) a diverter bar disposed under said rotatable platen proximate to said upper roller and pivoted for rotation between a first position in contact with said platen when said platen is not rotating for loading protective backing and a second position away from said platen when said platen is rotating.

7. The mechanism of claim 6, wherein said diverter bar includes a curved surface adapted to contact said platen in said first position to prevent protective backing from moving under said platen and to move away from said platen in said second position to prevent said diverter bar from contacting said rotating platen.

8. A mechanism for peeling protective backing from imaged print media in an image forming device having a rotatable platen, said mechanism comprising:

(a) a peel bar pivoted at a first end proximate to said rotatable platen and adapted to peel off imaged print media from a moving protective backing at a second end;

(b) an upper roller disposed proximate to said rotatable platen under said peel bar and adapted to be rotatably driven by said rotatable platen; and (c) a lower roller disposed under said upper roller and adapted to be pressed against said upper roller when said platen is rotating, said upper and lower rollers adapted to rotatably drive said protective backing downstream from said second end of said peel bar past said rotating platen at a faster speed than the speed of said rotating platen, said upper roller having an outer surface comprising a tungsten carbide layer with a polytetrafluoroethylene (PTFE) overcoat to allow slip to occur between said protective backing and said outer surface of said upper roller and to prevent said protective backing from sticking to said upper roller after imaged print media is peeled off from said protective backing at said second end of said peel bar, said outer surface of said upper roller not being in contact with said platen.

9. The mechanism of claim 1, wherein said peel bar is disposed over said upper roller at approximately 18° over the horizontal during the peeling operation.

10. The mechanism of claim 1, wherein said lower roller has an outer surface covered with an elastomeric coating.

11. The mechanism of claim 2, wherein said first and second gear mechanisms have a gear ratio adapted to provide a faster rotational surface speed for said upper roller relative to said rotatable platen.

12. The mechanism of claim 11, wherein said gear ratio results in an approximately 4% overdrive.

* * * * *